United States Patent
Waran et al.

(10) Patent No.: US 10,572,577 B2
(45) Date of Patent: Feb. 25, 2020

(54) SYSTEMS AND METHODS FOR MANAGING DOCUMENTS CONTAINING ONE OR MORE HYPER TEXTS AND RELATED INFORMATION

(71) Applicant: XEROX CORPORATION, Norwalk, CT (US)

(72) Inventors: Magesh Waran, Chennai (IN); Sangeeth Chandran, Kozhikode (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/722,043

(22) Filed: Oct. 2, 2017

(65) Prior Publication Data
US 2019/0102368 A1 Apr. 4, 2019

(51) Int. Cl.
*G06F 17/20* (2006.01)
*G06F 17/22* (2006.01)
(Continued)

(52) U.S. Cl.
CPC ...... *G06F 17/2235* (2013.01); *G06F 3/04842* (2013.01); *G06F 16/9577* (2019.01); *G06F 17/241* (2013.01); *G06K 9/00456* (2013.01); *G06K 9/2054* (2013.01); *G06F 17/2705* (2013.01); *G06K 2209/01* (2013.01)

(58) Field of Classification Search
CPC combination set(s) only.
See application file for complete search history.

(56) References Cited

U.S. PATENT DOCUMENTS

| 5,708,825 A | * | 1/1998 | Sotomayor | G06F 17/2235 |
| | | | | 715/205 |
| 7,178,099 B2 | * | 2/2007 | Meyer | G06Q 10/107 |
| | | | | 715/210 |

(Continued)

FOREIGN PATENT DOCUMENTS

| JP | 10301955 A | * | 11/1998 | ......... G06F 16/9577 |
| KR | 2003042601 A | * | 11/2001 | ............. G06F 17/30 |
| KR | 20040034861 A | * | 4/2004 | ......... G06F 16/9577 |

OTHER PUBLICATIONS

U.S. Appl. No. 15/498,811, filed Apr. 27, 2017; Systems and Methods for Printing Electronic Documents That Contain Hyperlinks; Naveenraj Kaliarajan and Anand Arokia Raj Antony Muthu Rayar.

*Primary Examiner* — Shahid K Khan
(74) *Attorney, Agent, or Firm* — Jones Robb, PLLC

(57) ABSTRACT

According to aspects illustrated herein, a method for preserving one or more hyperlinks while printing a document is disclosed. The method includes receiving the document containing one or more hyper texts, wherein each hyper text is associated with a corresponding hyperlink. The document is parsed to extract the one or more hyper texts. Then information related to the one or more hyper texts is identified and extracted, the information includes a hyper text, a hyperlink corresponding to the hyper text, a page number of the hyper text and an ordinal number of occurrence of the hyper text on the page number. An index page including the information related to the one or more hyper texts is created. Finally, the index page along with the document is printed, the index page includes the one or more hyper texts and information related to the one or more hyper texts.

9 Claims, 11 Drawing Sheets

(51) Int. Cl.
*G06F 17/24* (2006.01)
*G06F 3/0484* (2013.01)
*G06K 9/00* (2006.01)
*G06K 9/20* (2006.01)
*G06F 16/957* (2019.01)
*G06F 17/27* (2006.01)

(56) References Cited

U.S. PATENT DOCUMENTS

| | | | |
|---|---|---|---|
| 7,697,791 B1* | 4/2010 | Chan | G06Q 30/0263 |
| | | | 382/305 |
| 2002/0152236 A1* | 10/2002 | Incertis-Carro | G06F 16/9558 |
| | | | 715/205 |
| 2011/0010365 A1* | 1/2011 | Garcia | G06F 16/24578 |
| | | | 707/726 |

* cited by examiner

ABC Corporation /ˈz ɪɒks/ is an American global corporation that sells business services and document technology products. ABC it is headquartered in Norwalk, Connecticut (moved from Stamford, Connecticut in October 2007), though its largest population of employees is based around Rochester, New York, the area in which the company was founded. The company purchased Affiliated Computer Services for $6.4 billion in early 2010. As a large developed company, it is consistently places in the list of Fortune 500 companies.

Researchers at ABC and its Palo Alto Research Center invented several important elements of personal computing, such as the desktop metaphor GUI, the computer mouse and desktop computing. These concepts were frowned upon by the then board of directors, who ordered the ABC engineers to share them with Apple technicians. The concepts were adopted by XYZ and, later, PQR. With the help of these innovations, XYZ and PQR came to dominate the personal computing revolution of the 1980s, whereas ABC was not a major player.

FIG. 5A

ABC Corporation /ˈz rebs/ is an American global corporation that sells business services and document technology products. ABC is headquartered in Norwalk, Connecticut (moved from Stamford, Connecticut in October 2007), though its largest population of employees is based around Rochester, New York, the area in which the company was founded. The company purchased Affiliated Computer Services for $6.4 billion in early 2010. As a large developed company, it is consistently places in the list of Fortune 500 companies.

Researchers at ABC and its Palo Alto Research Center invented several important elements pf personal computing, such as the desktop metaphor GUI, the computer mouse and desktop computing. These concepts were frowned upon by the then board of directors, who ordered the ABC engineers to share them with Apple technicians. The concepts were adopted by XYZ and, later, PQR. With the help of these innovations, XYZ and PQR came to dominate the personal computing revolution of the 1980s, whereas ABC was not a major player.

FIG. 5B

SYSTEMS AND METHODS FOR MANAGING DOCUMENTS CONTAINING ONE OR MORE HYPER TEXTS AND RELATED INFORMATION

TECHNICAL FIELD

The present disclosure generally relates to document management. Specifically, the present disclosure discloses methods and systems for managing documents containing one or more hyper texts and related information.

BACKGROUND

Hyperlinking technology is commonly seen across various documents which are available in the form of electronic. The electronic document includes one or more hyperlinks pointing to one or more hyperlink destinations. Upon clicking a hyperlink in the electronic document, a program application may be launched to open the content located at the hyperlink destination. Alternatively, data (text) of the hyperlink may be tapped or hoovered to open the hyperlink. To differentiate the data of a hyperlink from other data within the electronic document, the data of the hyperlink may be displayed in a different color or differently formatted from the other data. For example, the hyperlinked text may be underlined, bold, italics, colored, or a combination. An example of a hyperlink destination is a Uniform Resource Locator (URL). A URL is a global address of documents and other resources on the World Wide Web (www) and is a string of characters conforming to a standardized format that refers to data on the Internet by their location. An example of a URL is http://www.abc.com/products/index.html. In an example, the primary role of the hyperlink is to provide additional information about content provided in the document such as author name, date of publishing or the like.

The hyperlinks are very well captured in the digital form. But when a user wants to print a document, then these hyperlinks are not captured and listed anywhere in the print out for offline readers. In such cases, it becomes difficult for the offline readers to go back and refer to any additional information about the content of the document. Further, if the user scans back the same document, the hyperlink cannot be retrieved or it has been lost. This limits/blocks the referencing capability of the reader/user and wants him to rely on the original soft version. It may therefore be advantageous to provide methods and systems managing documents containing hyperlinks such that the hyperlinks are maintained in the documents or along with the documents.

SUMMARY

According to aspects illustrated herein, a method for preserving one or more hyperlinks while printing a document is disclosed. The method includes receiving the document containing one or more hyper texts from a computing device of a user, wherein each hyper text is associated with a corresponding hyperlink. The one or more hyper texts are formatted differently than remaining content of the document. The document is parsed to identify and extract the one or more hyper texts. Then information related to the one or more hyper texts is identified and extracted, the information includes a hyper text, a hyperlink corresponding to the hyper text, a page number of the hyper text and an ordinal number of occurrence of the hyper text on the page number. An index page including the one or more hyper texts and the information related to the one or more hyper texts is created. Finally, the index page along with the document is printed, the printed document includes the one or more hyper texts in the original format, the index page includes the one or more hyper texts and information related to the one or more hyper texts and the index page enables the user to refer to additional information related to the one or more hyper texts.

According to other aspects illustrated herein, a method is disclosed. The method includes receiving an index page along with a document for scanning, the index page comprises one or more text phrases to be hyperlinked and additional information related to each text phrase, the additional information comprises a hyperlink corresponding to a text phrase, a page number of the text phrase and an ordinal number of occurrence of the text phrase on the page number. The index page is scanned to create a scanned index page. Then, an Optical Character Recognition (OCR) is performed on the scanned index page to extract the one or more text phrases and the additional information related to each text phrase. Thereafter, the document is scanned to create a scanned version of the document. Then, OCR is performed on the document to extract content of the document. Then, the extracted additional information related to each text phrase is compared with the content of the document, wherein comparing comprises searching for (i) a page number, (ii) a text phrase on the page number, and (iii) an ordinal number of the text phrase in the extracted content of the document. For each text phrase of the index page, the corresponding hyperlink is embedded to the searched hyper text in the extracted content of the document. A digital version of the document is created including the embedded hyperlink corresponding to each text phrase. Finally, the digital version of the document is sent to a computing device of a user, where the digital version of the document includes the hyperlink corresponding to each text phrase.

According to further aspects illustrated herein, a system for maintaining one or more hyperlinks while printing a document is disclosed. The system includes a receiving module, a hyperlink manager and a printing module. The receiving module is configured for receiving the document containing one or more hyper texts from a computing device of a user, wherein each hyper text is associated with a corresponding hyperlink, the one or more hyper texts are formatted differently than remaining content of the document. The hyperlink manager is configured for parsing the document to identify and extract the one or more hyper texts; identifying and extracting information related to the one or more hyper texts, the information comprises a hyper text, a hyperlink corresponding to the hyper text, a page number of the hyper text and an ordinal number of occurrence of the hyper text on the page number; creating an index page including the one or more hyper texts and the information related to the one or more hyper texts. Finally, the printing module is configured for printing the index page along with printing the document, the printed document includes the one or more hyper texts in the original format, the index page comprises the one or more hyper texts and the information related to the one or more hyper texts and the index page enables the user to refer to the information related to the one or more hyper texts.

According to additional aspects illustrated herein, a system is disclosed. The system includes a platen, a scanning module, an Optical Character Recognition (OCR) module and a hyperlink manager. The platen is configured for: receiving an index page along with a document for scanning, the index page comprises one or more text phrases to be hyperlinked and additional information related to each text phrase, the additional information comprises a hyperlink corresponding to a text phrase, a page number of the text phrase and an ordinal number of occurrence of the text phrase on the page number. The scanning module is configured for scanning the index page to create a scanned index page; and scanning the document to create a scanned document. The OCR module is configured for performing an Optical Character Recognition (OCR) on the scanned index page to extract the one or more text phrases and the additional information related to each text phrase; and performing OCR on the document to extract content of the document. The hyperlink manager is configured for: comparing the extracted additional information related to each text phrase with the content of the document, wherein comparing comprises: searching for (i) a page number, (ii) a text phrase on the page number, and (iii) an ordinal number of the text phrase in the extracted content of the document for each text phrase of the index page, embedding the corresponding hyperlink to the searched text phrase in the extracted content of the document; creating a digital version of the document including the hyperlink embedded corresponding to each text phrase; and sending the digital version of the document to a computing device of a user, where the digital version of the document includes the hyperlink corresponding to each text phrase.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIGS. 5A-5C, 6A-6B, 7 and 8 show various exemplary snapshots according to an embodiment of the disclosure.

DESCRIPTION

Figure 1:
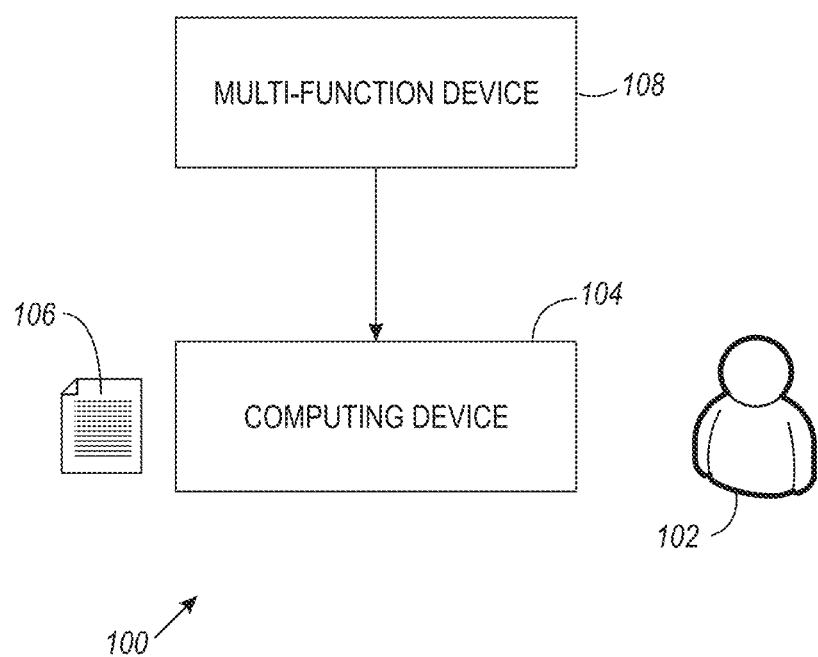
FIG. 1 illustrates an exemplary environment, wherein various embodiments of the present disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity, and are intended to include more examples than just provided below.

The term "multi-function device" refers to a device or a combination of multiple devices configured to perform one or more functions, but not limited to, scanning, printing, copying, imaging, and so forth. The multi-function device includes software, hardware, firmware, or combination thereof. In the context of current disclosure, the multi-function devices manages documents containing hyper texts such that hyperlinks are preserved within the document at the time of printing a document and scanning a document.

A "document" refers to any document containing one or more hyper texts. Various examples of the documents include, but are not limited to, Portable Document Format (PDF), Microsoft DOC format, Hypertext Markup Language (HTML) format, Extensible Markup Language (XML) format, Microsoft XLS format, and Tag Image File Format (TIFF). The document may also be referred to as an input document. The document can be in a virtual or software form (embodied in a software file) or can be in physical form, such as printed on paper. The virtual form can also be referred to as digital form, electronic version or the like. The document includes content in the form of text, image, graphics or a combination thereof. The document may be submitted at the time of printing, where the document submitted is in the virtual or software form and is submitted from a computing device of a user. The document may be submitted at the time of scanning, where the document submitted is in the physical form and is submitted by a user.

The term "hyper text" refers to text content in the document which is hyperlinked to a web server or destination. In other words, the hyper text is a text containing references or hyperlinks to other text which can be accessed by the user. The hyper text may also be termed as "hyperlinked text."

The term "hyper link" is a Uniform Resource Locator (URL).

The term "information" refers to details related to the hyper text for identifying the hyper text in the document. The "additional information" may be such as hyperlink corresponding to the hyper text, a page number on which the hyper text appears and an ordinal number of occurrence of the hyper text on the page number. The ordinal number of occurrence of the hyper text indicates the position of the hyper text on the particular page. The "information" may be referred to as the "additional information" related to the hyper text.

The term "index page" refers to an additional page created by the multi-function device. The index page contains the additional information related to one or more hyper texts. "Additional page" may also be termed as "annexure page."

The term "computing device" refers to a user device that the user typically uses for giving print commands and/or for receiving scanned documents. Examples of the computing device include, but are not limited to, a personal computer, a laptop, a mobile phone, a tablet, PDA, a smart-phone or any other device capable of data communication.

The following detailed description is provided with reference to the figures. Exemplary, and in some case preferred, embodiments are described to illustrate the disclosure, not to limit its scope, which is defined by the claims. Those of ordinary skill in the art will recognize a number of equivalent variations in the description that follows.

Overview

The primary aim of the disclosure is to process documents such that hyperlinks are preserved in both virtual form and physical form of the documents, without any loss of information. To this end, the present disclosure provides methods and systems for managing documents containing one or more text phrases (hyper texts) which are hyperlinked. Specifically, the disclosure manages documents such that hyper texts within the document are maintained at the time of printing and/or scanning. At the time of printing, the system prints an additional page containing details related to the hyper texts such as a hyper text, a hyperlink corresponding to the hyper text, a page number and an ordinal number of occurrence of the hyper text corresponding to each hyper text. At the time of scanning, the system takes an index page as an input along with a document for scanning. Based on the index page, the system identifies one or more text phrases to be hyperlinked and embeds hyperlinks to the identified text phrases while scanning the document. At the end, the system sends the scanned document with embedded hyperlinks to the computing device of the user.

Exemplary Environment

FIG. 1 illustrates an exemplary environment 100, in which various embodiments of the present disclosure can be practiced. The environment 100 includes a user 102, a computing device 104, a document 106, and a multi-function device 108. Various examples of the computing device 104 may include, but not limited to, a desktop PC, a laptop, a notebook, a workstation, a personal digital assistant (PDA), a mainframe computer, a mobile computing device, a mobile device, an internet appliance, and so on. In all, the computing device 104 can be any electronic device that can be used by a user such as the user 102, for giving print commands and/or for receiving scanned documents. Various examples of the multi-function device 108 may be a printer, a scanner or a combination thereof.

The computing device 104 is coupled to the multi-function device 108 through a communication network (although not shown). The communication network may be a wireless network, a wired network or a combination thereof. The communication network may be implemented as one of the different types of networks, such as intranet, Local Area Network (LAN), Wide Area Network (WAN), the Internet, and the like. The communication network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the communication network may include a variety of network devices, including routers, bridges, servers, computing devices, storage devices, and the like.

As shown, the user 102 uses the computing device 104 for performing his daily tasks such as emails, surfing, chatting, social networking or the like. The user 102 uses the computing device 104 for giving print commands via a number of applications running on the computing device 104, such as Microsoft (MS) word, MS Excel, MS PPT, or the like. The user 102 also uses the computing device 104 for receiving scanned documents from the multi-function device 108. The multi-function device 108 performs the traditional functionality of printing, scanning, copying, faxing, imaging, or the like. In context of the current disclosure, the multi-function device 108 manages documents containing one or more hyper texts and related information and this will be discussed below in more detail.

As shown, the user 102 sends the document 106 for printing via the computing device 104 to the multi-function device 108. The document 106 includes one or more pages and includes content in the form of text, graphics, images, or a combination thereof. At least one page includes one or more text phrases which are hyperlinked (also refer to as hyper texts). In some examples, each page may have one or more hyper texts. In other examples, some pages may have hyper texts, while other pages may not have hyper texts. The hyper text is presented in a pre-defined format such as blue color, underline, bold, italics or the like for easy identification of the hyper text. Further, each page of the document 106 is associated with a page number.

The multi-function device 108 receives the document 106 for printing from the computing device 104. Upon receiving, the multi-function device 108 analyzes the document 106 to identify the one or more hyper texts and extract hyper texts from the document 106. The information or details related to the hyper texts are retrieved such as a hyper text, the corresponding hyperlinks, a page number on which the hyper text appears, and the occurrence of the hyper text on the page number. Based on the retrieved information, the multi-function device 108 creates an index page including the information related to the hyper texts and prints the index page. Along with the index page, the multi-function device 108 prints the original document 106 received from the user 102. The printed index page enables the user 102, for example, offline readers to refer additional information related to the hyper texts. In this manner, the index page is very helpful for the user 102 as the user 102 does not need to go back to the document 106 for identifying hyperlinks. In this manner, the hyperlinks are maintained while printing the document 106.

Similar to maintaining the hyperlinks at the time of printing, the multi-function device 108 maintains or preserves the hyperlinks at the time of scanning. At the time of scanning, the multi-function device 108 receives an index page corresponding to a document such as a document 106 given for scanning. The index page includes details such as hyper texts and additional information related to the hyper texts including hyperlinks, page numbers and ordinal numbers. The multi-function device 108 first scans the index page, and identifies one or more hyper texts to be hyper linked. The multi-function device 108 then searches for the hyper texts in the scanned document and embeds corresponding hyperlinks to the identified hyper texts in the scanned document at appropriate places. More details will be discussed in following figures.

Figure 2:
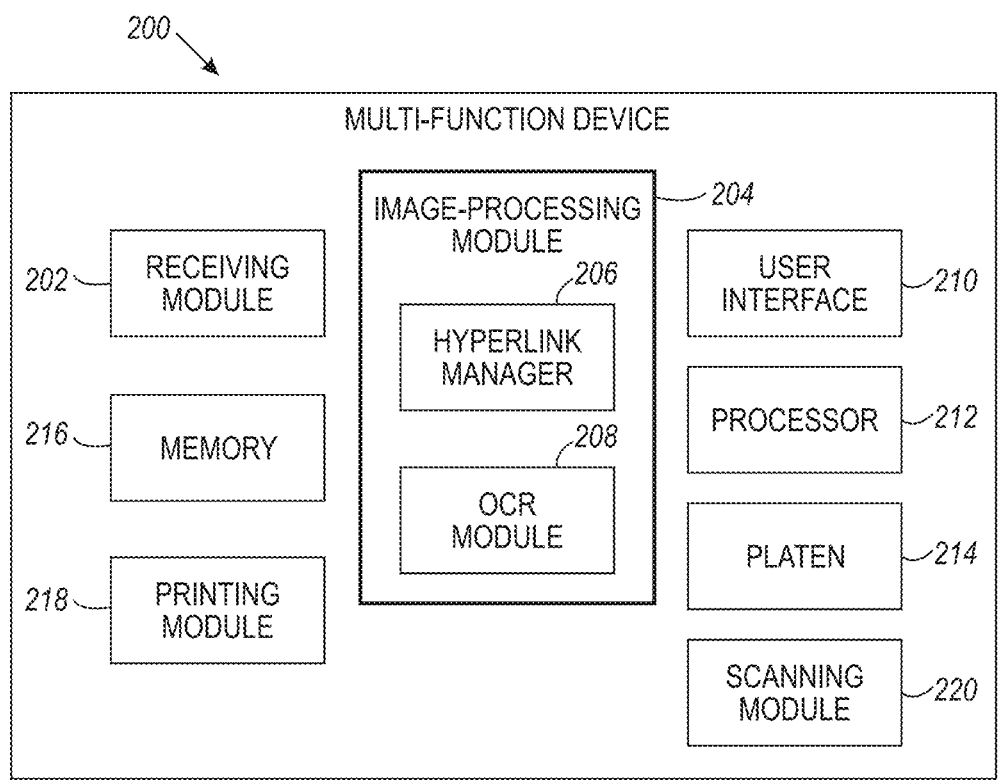
FIG. 2 shows a system block diagram illustrating various components, according to an embodiment of the disclosure.

FIG. 2 is a system 200 illustrating various components for managing documents containing one or more hyper texts. Various examples of the system 200 may include a multi-function device, a printer, a scanner or a combination thereof. The system 200 may be used for printing, scanning or for both purposes. The system 200 includes a receiving module 202, an image processing module 204 having a hyperlink manager 206 and an Optical Character Recognition (OCR) module 208, a user interface 210, a processor 212, a platen 214, and a memory 216. The system 200 is in communication with a computing device and/or with a server and is coupled through a communication network as discussed above.

The system 200 is discussed with respect to printing and scanning case scenarios.

Printing Case Scenario

As shown, the receiving module 202 receives a document for printing from a computing device of a user. The document includes one or more pages, where the one or more pages include one or more hyper texts, i.e., the text content which is hyperlinked. In some examples, each page may include hyper texts, while in other example some pages may include hyper texts. The receiving module 202 passes the document to the image processing module 204 for further processing. Specifically, the receiving module 202 passes the document to the OCR module 208.

The OCR module 208 receives the document and starts processing the document. The OCR module 208 analyzes the document having one or more hyper texts and performs optical character recognition to extract the hyper texts given in the document. The hyper texts may be formatted differently than other content/text in the document. The OCR module 208 extracts content from the document and passes the extracted content of the document to the hyperlink manager 206. Then, the hyperlink manager 206 identifies the hyper texts based on the format and extracts the hyper texts from the document. The hyperlink manager 206 then identifies the corresponding hyperlink, a page number on which the hyper text is present and the occurrence of the hyper text on the page number. This is achieved based using third party libraries as available. For example, the hyperlink manager 206 uses the third party libraries such as Adobe pdf libraries, itext, etc., for PDF documents, Microsoft libraries for word document, and the so forth. The same libraries can be used embedding hyperlinks in the scanned document. The hyperlink manager 206 repeats the procedure for each hyper text given in the document.

After collecting the information about each hyper text, the hyperlink manager 206 creates an index page to include the additional information related to the hyper texts. In this manner, the hyperlink manager 206 creates the index page having the additional information about the hyper texts. The index page outlines the additional information in a predefined format. For example, the index page first outlines the hyper text itself and then additional information related to the hyper texts such as a hyperlinks, a page number and an ordinal number. This is just one example, other formats may also be applicable for the index page. Further, the index page represents a separate document. In some embodiments, the index page may be merged with the received document to create a final document for printing. The index page may be merged at the end of the document. The image processing module 204 passes the received document along with the created index page to the printing module 218.

The printing module 218 prints the received document. In the context of the current disclosure, the printing module 218 prints the index page along with the document. The index page outlines the additional information related to the hyper texts and further helps the offline users or readers to refer to any additional information about the hyper texts.

Scanning Case Scenario

In the context of the present disclosure, the platen 214 receives a document (i.e., in the physical form) and an index page corresponding to the document from the user for scanning.

The scanning module 220 scans the index page and creates a scanned version of the index page. The index page may be in the physical form. While in other examples, the index page may be in the virtual form such as an MS Excel sheet that may be uploaded to the multi-function device 200 by the user. The index page includes one or more hyper texts and information related to the hyper texts. For example, the information may include a hyperlink, a page number and an ordinal number related to the hyper texts. On the similar lines, the scanning module 220 scans the document to create a scanned version of the document. The scanning module 220 then passes the scanned index page and the scanned document to the image processing module 204, in particular to the OCR module 208, for further processing.

The OCR module 208 receives the scanned index page and the scanned document. Upon receiving, the OCR module 208 performs OCR on the index page as well as on the scanned document. During the OCR, the OCR module 208 extracts hyper texts and additional information such as hyperlinks, page numbers and ordinal numbers. The hyperlink manager 206 then compares the extracted information related to the hyper text with the content of the document. For each hyper text, the hyperlink manager 206 searches for a corresponding page number, the hyper text in the extracted content of the scanned document, the ordinal number of the hyper text on the identified page number. The hyperlink manager 206 then embeds the corresponding hyperlink to the searched text in the scanned document. The hyperlink manager 206 repeats the procedure for each hyper text in the index page and completes the process of embedding hyperlinks to each identified text. In this manner, the hyperlink manager 206 creates a digital version of the document including hyperlinks corresponding to each hyper text. The hyperlink manager 206 sends the digital version of the document to the computing device of the user, where the digital version of the document includes the hyperlink corresponding to each hyper text. While reading the document online, the document with hyperlink is helpful for the user.

The processor 212 processes the request as received from the user and communicates with the components 202-210 and 214-220 for implementing the current disclosure.

The memory 216 stores received document, the created index page for future reference and other purposes. The index page is associated or linked to the document. The memory 216 further stores the digital version of the document and/or any other details related to the document and the computing device of the user.

Specific Case Scenario

In some cases, there is a requirement where the user wants to add more hyperlinks to the digital version of the document containing hyperlinks. In such cases, the user interface 210 is provided to the user for providing inputs. The user interface 210 enables the user to preview or view the digital version of the document. The user interface 210 enables the user to select one or more text phrases to be hyperlinked and to provide corresponding one or more hyperlinks. Once provided, the hyperlink manager 208 processes the request and embeds the provided hyperlinks to the text phrases as selected by the user.

Exemplary Flowcharts

Figure 3:
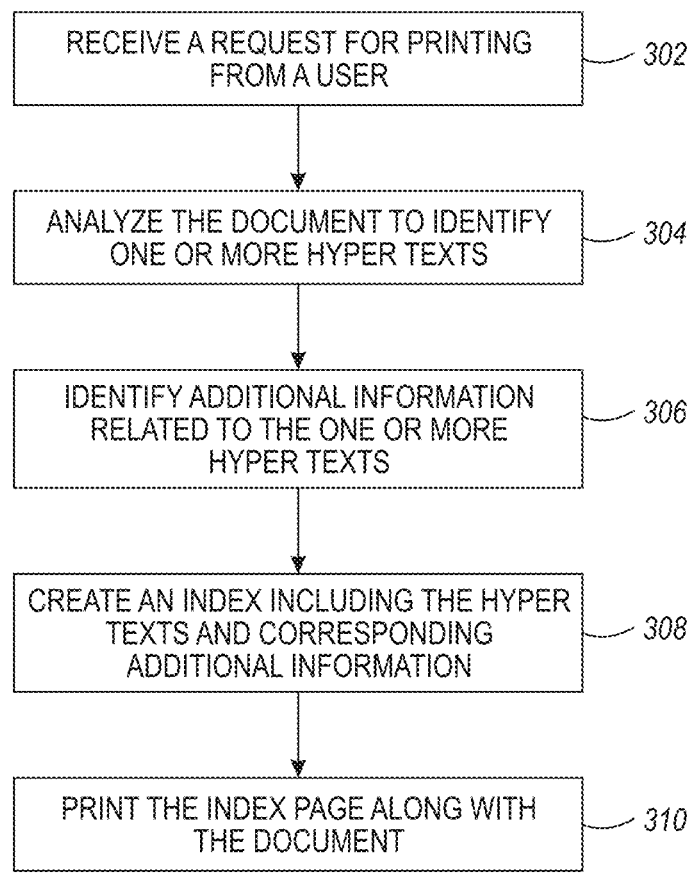
FIG. 3 is a flowchart illustrating a method of managing a document containing one or more hyper texts.

FIG. 3 is a flowchart illustrating a method for handling documents containing hyperlinks, i.e., texts which are hyperlinked. The flowchart is described with respect to printing case scenario. Here, a request for printing a document is received from a user.

At block 302, a document is received for printing from a user. Various examples of the document includes but not limited to, a Portable Document Format (PDF), a Microsoft (MS) DOC format, a Hypertext Markup Language (HTML) format, an Extensible Markup Language (XML) format, an MS XLS format, and a Tag Image File Format (TIFF). The document includes one or more hyper texts. After receiving the document, at block 304 the document is parsed or analyzed to identify the one or more hyper texts. In particular, an Optical Character Recognition operation is performed to identify the one or more hyper texts in the document. The hyper texts may be present on a single page of the document or may be present across multiple pages of the document. Then, at block 306, additional information associated with each hyper text is identified and extracted. The additional information includes but not limited to, hyperlinks, page number on which the hyperlink appears and an ordinal occurrence of the hyper texts. For example, the hyper text word itself, the hyperlink corresponding to the hyper text, the page number and the ordinal number of occurrence. Based on the extraction, at block 308, an index page is created containing the hyper texts and corresponding additional information. The index page contains details so that it becomes easier for user to refer to the hyperlink or more details related to the hyperlinked content. Thereafter, the index page is printed including the hyper texts and corresponding additional information. The index page is in a pre-defined format. The printed document includes the one or more hyper texts in the original format. At block 310, the index page is printed along with the document. Now when the user wishes to read the document, the index page can be referred by the user for any additional details or information about the hyperlinked content.

In some embodiments, the index page may be combined with the document create a new final document for printing. The index page may be appended to the end of the document.

Figure 4:
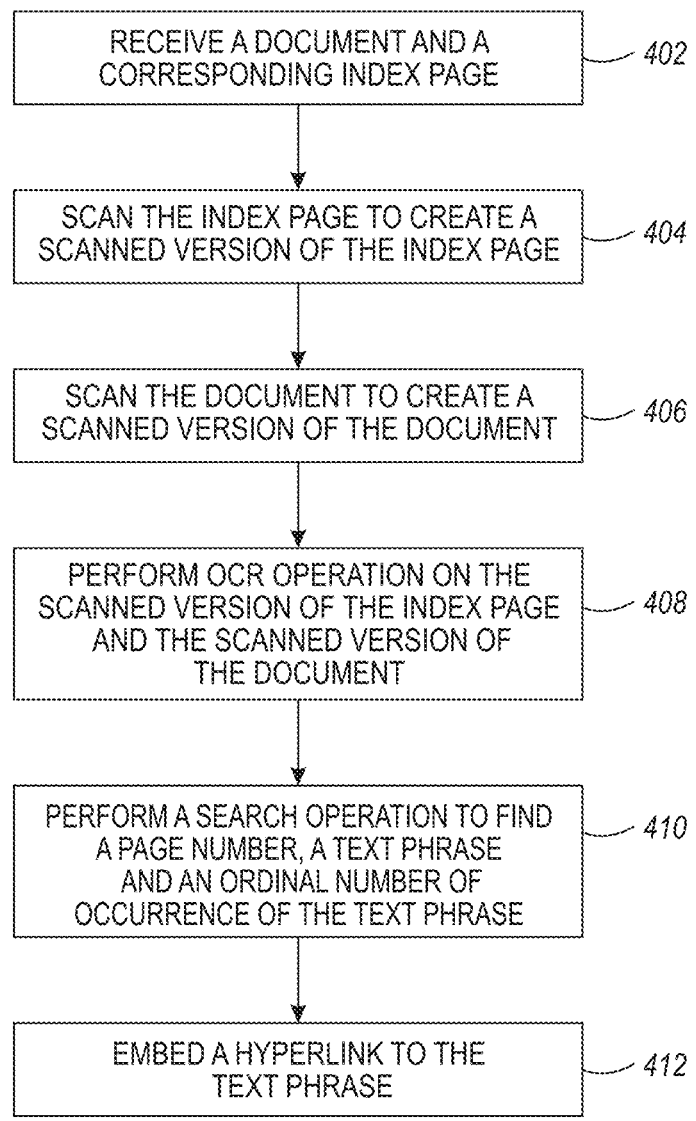
FIG. 4 is a flowchart illustrating a method for managing a document containing one or more hyper texts and related information.

FIG. 4 is a flowchart for handling documents. The method flowchart is discussed with respect to scanning case scenario. Here a request for scanning is received from a user. The word hyper text may be used interchangeably with the phrase text phrase in case of scanning scenario.

The method begins when a user submits a document in the physical form. While submitting the document, the user also submits an index page. The index page includes one or more hyper texts and information related to one or more hyper texts. The information about the hyper texts include hyperlinks, page numbers and an ordinal number. At block 402, a document and corresponding index page is received. The index page may be created manually by the user or may be automatically created by a system such as a multi-function device. In the case of manual, the index page may be uploaded by the user to a multi-function device for example. At block 404, the index page is scanned first to create a scanned version of the index page. Similarly, the document is scanned to create a scanned version of document at 406. At block 408, an OCR operation is performed on the scanned index page to extract hyper texts (or text phrases to be hyperlinked) and corresponding additional information. Similarly, OCR operation is performed on the scanned version of the document to extract content of the document. The extracted information related to the hyper text is compared with the extracted content of the document. Then, at block 410, for each text phrase, a search operation is performed first to identify a page number associated with the text phrase. Then, further search operation is performed to find the text phrase on the identified page. Thereafter, the ordinal number of the occurrence of the text phrase is searched. Once identified, a corresponding hyperlink is embedded to the text phrase at block 412. In this manner, the text phrase is hyperlinked to a destination. The same procedure is repeated for each hyper text as given in the index page. In this manner, a digital version of the document is created, the digital version includes the hyperlinks to the corresponding text phrases. The digital version is saved in the multi-function device. Then, the digital version of the document is sent to the computing device of the user. In some embodiments, sorting may be performed based on page number. For example, while scanning the document, first a page number is searched for (say page no. 1), then a hyper text is searched for (say abc), then Ordinal number (2 &5) of the word and embed the hyperlink to that word.

Exemplary Snapshots

Figure 5C:
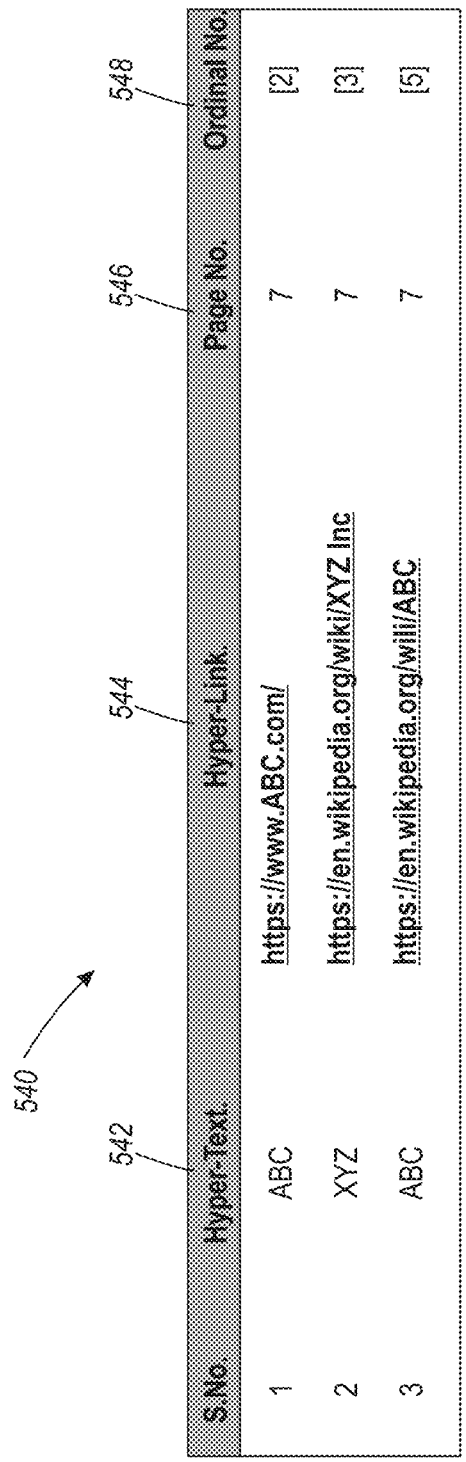

For easy understanding of the disclosure, a few exemplary snapshots are shown in FIGS. 5A-5C, 6A-6B, 7 and 8. FIG. 5A shows an exemplary document 500 received from the user for printing. The document 500 includes text phrases such as 506, and 508, i.e., the text which is not hyperlinked. As shown, one or more hyper texts are 502, 504, 510 and 512. The document 500 is submitted by the user for printing, and as a next step, the document 500 is processed by the multi-function device and is printed. In FIG. 5B, the printed document marked as 520 is shown. As indicated in the snapshot, the printed document 520 includes the hyper text in the same format as in the received document. This helps offline readers to identify hyper texts with ease. For example, the hyper texts 524 (504 of FIG. 5A), 530 (510 of FIG. 5A), and 532 (512 of FIG. 5A) are underlined as shown in the document 500. Similarly, the text phrase 522 (502 of FIG. 5A) is bold. Along with printing the document 520, the multi-function device also prints the index page 540. The printed index page corresponding to the document 500 is shown in FIG. 5C as 540. The index page 540 is presented in a format including information such as hyper text as 542, hyper link as 544, page number as 546 and an ordinal number as 548. The index page 540 can be referred by offline readers for more information. For example, the user may use the hyperlink information to have more details about the particular text phrase or content.

Figure 6A:
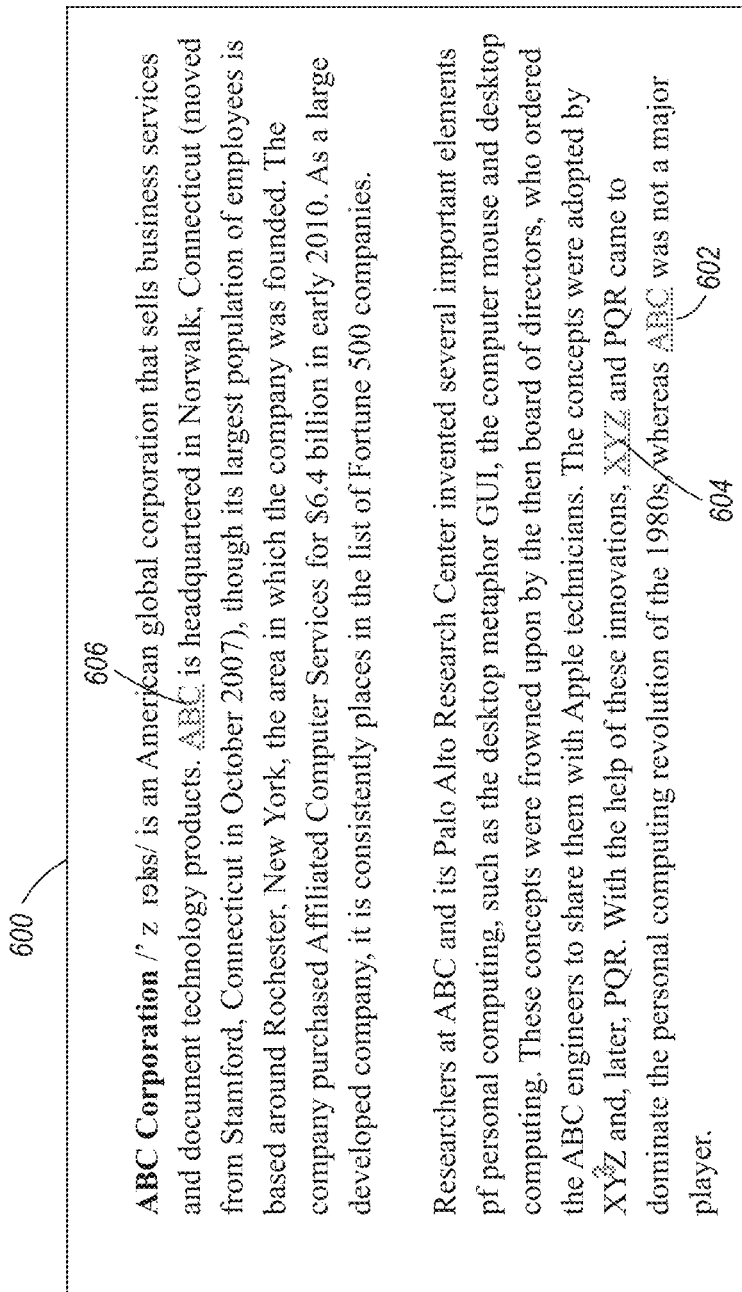
Figure 6B:
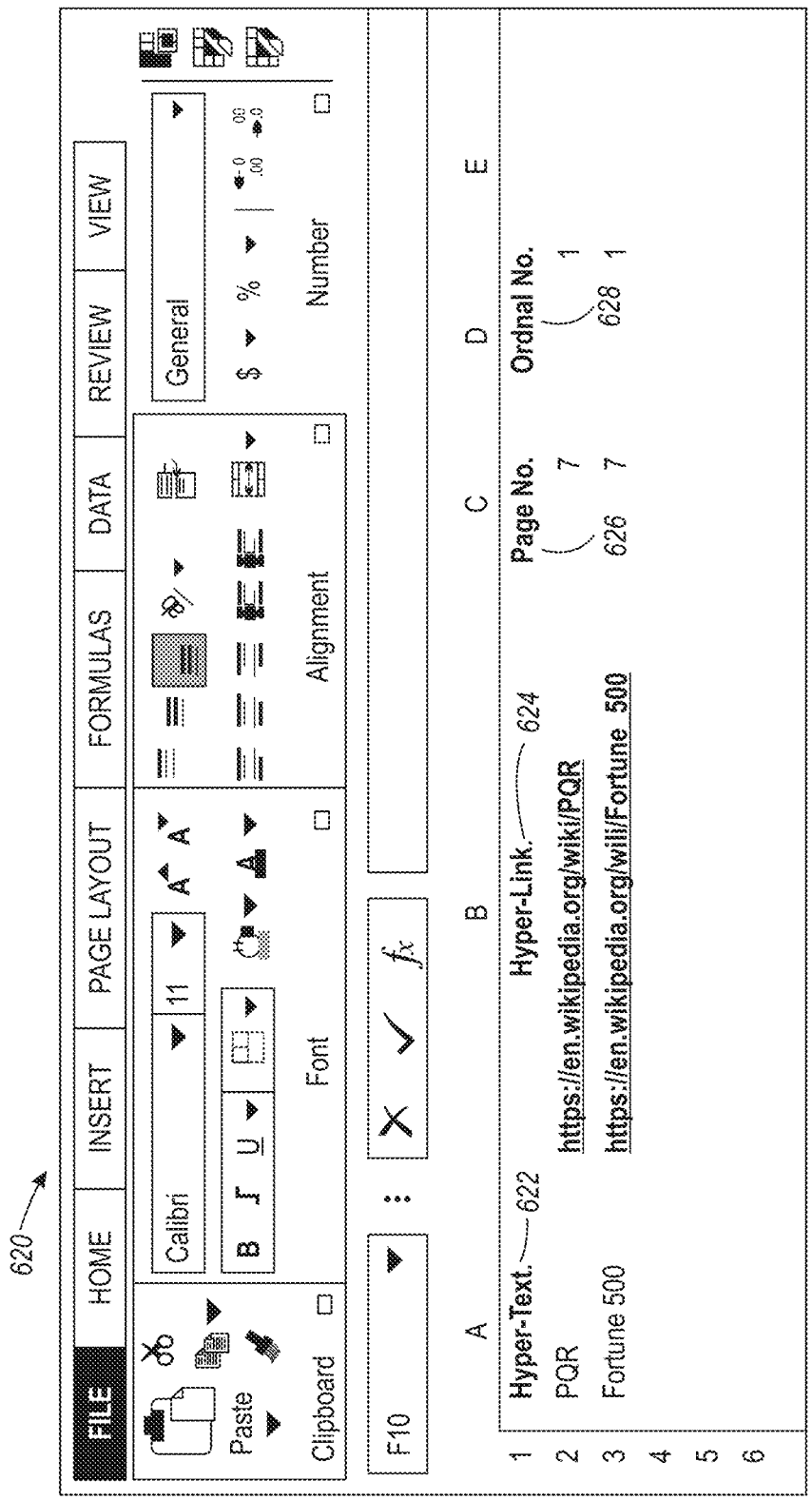

Similarly, snapshots are shown with respect to scanning scenarios. In the snapshot 600 of FIG. 6A, a scanned version is shown. After scanning the received document, the multi-function device outputs the scanned document 600 as shown in FIG. 6A. As shown, the scanned version of the document 600 includes texts phrases with embedded hyperlinks such as 602, 604 and 606. The text phrases which are embedded with hyperlinks are formatted differently than the remaining content or text of the document. For example, the text phrases 602 604 and 606 are underlined. This is just one example, each text phrase may be formatted differently than each other. Further, FIG. 6B shows an exemplary index page 620 as created by the user. The index page 620 is in the form of an excel sheet containing details such as hyper text as 622, hyperlink as 624, page number as 626 and ordinal number as 628. Under the column hyper text marked as 622, one or more hyper texts are shown. Similarly, under the column hyperlink marked as 624, one or more hyperlinks are shown.

Figure 7:
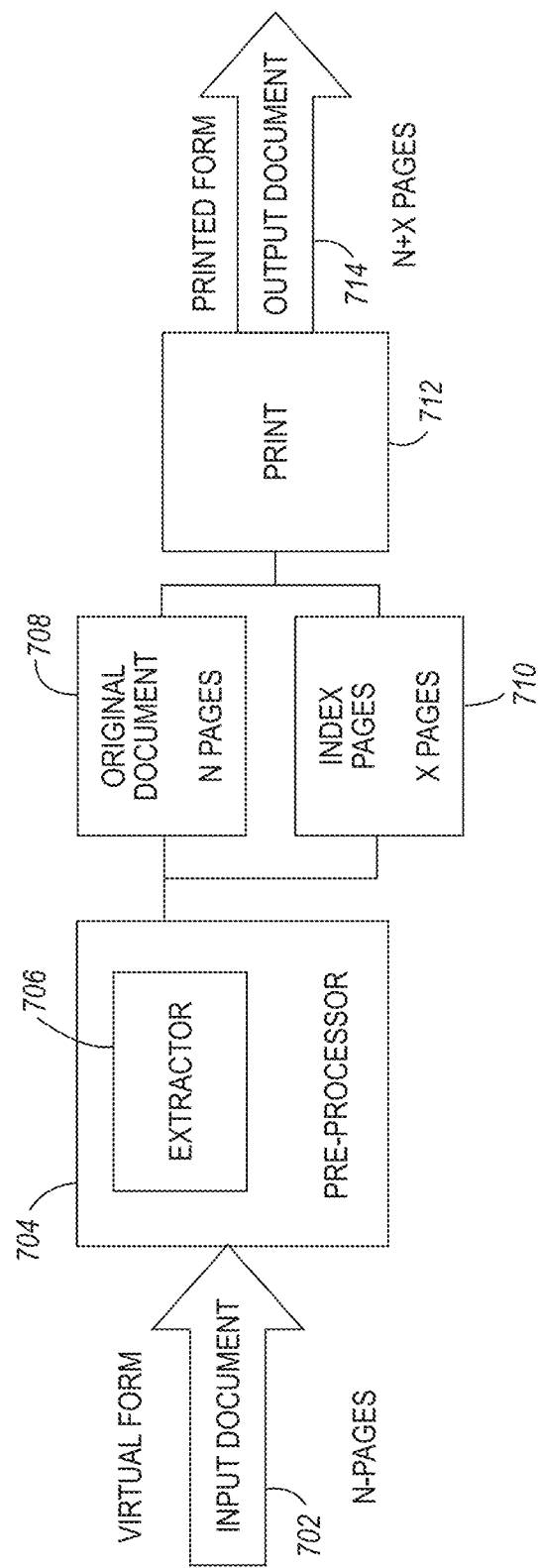

For easy understanding, an exemplary flow diagram 700 is shown in FIG. 7. As shown, an input document 702 of N pages is provided as an input and the input document 702 is in the virtual form. The input document 702 is received by a pre-processor 704 including an extractor 706 that extracts content of the document 702. The pre-processor 704 processes the document 702 and creates an additional page, i.e., an index page 710 of X pages. The original document marked as 708 and the index page 710 is sent for printing marked as 712. Finally, the index page 710 and the original document 708 are printed. Here, the output document 714 is the printed document of N+X pages.

Figure 8:
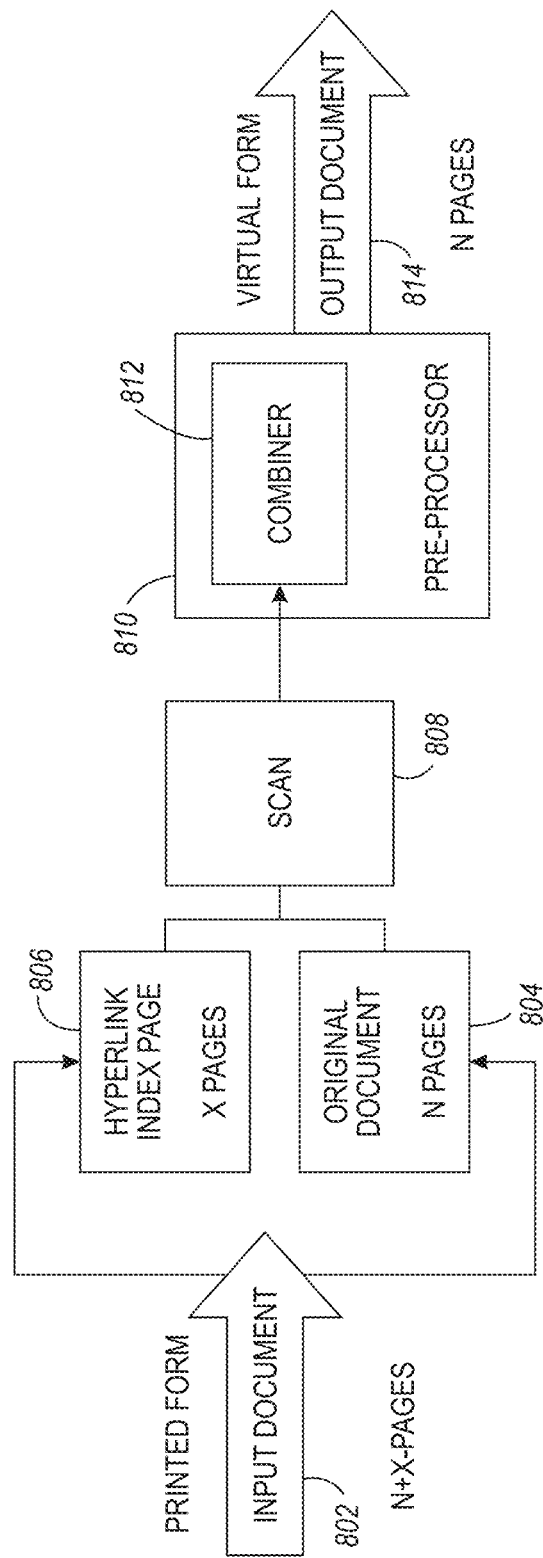

For easy understanding, an exemplary flow diagram 800 is shown in FIG. 8, where an input document 802 is provided. The input document 802 includes an original document 804 of N pages and a hyperlink index page 806 of X pages, where N indicates number of pages for original document, while X indicates number of pages for index page. The input document 802 is sent for scanning marked as 808. The document 802 is then sent to a post-processor 810 including a combiner 812, where the combiner 812 combines the index page 806 and the original document 804. The combiner 812 processes the index page 806 and the original document 804 such that text phrases are embedded with hyperlinks as given in the index page 806. In this manner, the output document 814 of N pages is generated including the hyperlinked text phrases.

The present disclosure discloses methods and systems for handling documents containing hyper texts and related information. The documents are handled such that hyperlinks are preserved in both virtual form and physical form of the documents, without any loss of information. For example, the methods and systems print an additional page, i.e., an index page containing hyper texts and corresponding information. The methods and systems printing only an index page instead of printing additional pages and thus, avoids unnecessary printing. Further, the methods and systems customize hyperlinks in a virtual form of a document using the same original physical form of the document. Here, manual effort for embedding hyperlinks can be avoided. Additionally, the methods and systems enable a user can embed his custom hyperlink for any word by adding additional entry into the index.

For a person skilled in the art, it is understood that the use of phrase(s) "is," "are," "may," "can," "could," "will," "should," or the like, is for understanding various embodiments of the present disclosure and the phrases do not limit the disclosure or its implementation in any manner.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "identifying," or "scanning," or "printing," or "embedding," or "sending," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for preserving one or more hyperlinks while printing a document, the method comprising:
   receiving the document containing one or more hyper texts from a computing device of a user, wherein each hyper text of the one or more hyper texts is associated with a corresponding hyperlink, the one or more hyper texts being formatted differently than remaining content of the document;
   using optical character recognition to parse the document to identify and extract the one or more hyper texts based on a format of the hyper texts in the document;
   identifying and extracting the corresponding hyperlink of each extracted hyper text;
   identifying and extracting information related to each extracted hyper text, the information including a page number of the hyper text and an ordinal number of occurrence of the hyper text on the page number;
   creating an index page including each extracted hyper text, the corresponding hyperlink of each extracted hyper text, and the information related to each extracted hyper text;
   prompting a user to select one or more phrases in the document to be hyperlinked and providing a corresponding hyper text and hyper link for each selected phrase of the one or more phrases;
   updating the index page to include the corresponding hyper text and hyper link of each selected phrase of the one or more phrases; and
   printing the index page along with printing the document,
      the printed document including each extracted hyper text and the corresponding hyper text of each selected phrase, and
      the index page including each extracted hyper text, the corresponding hyper link of each extracted hyper text, the information related to each extracted hyper text, the corresponding hyper text of each selected phrase, the corresponding hyper link of each selected phrase, and information related to each selected hyper text.

2. The method of claim 1, wherein the index page is in a pre-defined format.

3. The method of claim 1, wherein the index page is separate from the document.

4. The method of claim 1, further comprising combining the index page with the document to create a final document for printing.

5. The method of claim 1, further comprising storing the index page in a memory.

6. The method of claim 1, further comprising extracting the information related to the one or more hyper texts.

7. A system for maintaining one or more hyperlinks while printing a document, the system comprising:
   a non-transitory memory storing instructions;
   a processor for executing the instructions stored on the memory;
   a receiving module, executed by the processor, for:
      receiving the document containing one or more hyper texts from a computing device of a user, wherein each hyper text of the one or more hyper texts is associated with a corresponding hyperlink, the one or more hyper texts being formatted differently than remaining content of the document;
   an Optical Character Recognition (OCR) module, executed by the processor, for: performing OCR on the document to identify and extract the one or more hyper texts based on a format of the hyper texts in the document;
   a hyperlink manager, executed by the processor, for:
      identifying and extracting the corresponding hyperlink of each extracted hyper text,
      identifying and extracting information related to each extracted hyper text, the information including a page number of the hyper text and an ordinal number of occurrence of the hyper text on the page number,
      creating an index page including each extracted hyper text, the corresponding hyperlink of each extracted hyper text, and the information related to each extracted hyper text;
      prompting a user to select one or more phrases in the document to be hyperlinked and providing a corresponding hyper text and hyper link for each selected phrase of the one or more phrases, and
      updating the index page to include the corresponding hyper text and hyper link of each selected phrase of the one or more phrases; and
   a printing module configured for printing the index page along with printing the document,
      the printed document including each extracted hyper text and the corresponding hyper text of each selected phrase, and the index page including each extracted hyper text, the corresponding hyperlink of each extracted hyper text, the information related to each extracted hyper text, the corresponding hyper text of each selected phrase, the corresponding hyper link of each selected phrase, and information related to each selected hyper text.

8. The system of claim 7, wherein the memory stores the index page.

9. The system of claim 7, wherein the hyperlink manager is for combining the index page with the document to create a final document for printing.

* * * * *